United States Patent [19]
Brown

[11] Patent Number: 5,249,472
[45] Date of Patent: Oct. 5, 1993

[54] WIRE TENSION METER

[76] Inventor: Maurice H. Brown, 9366 N. Milan Way, Citrus Springs, Fla. 32630

[21] Appl. No.: 813,141

[22] Filed: Dec. 23, 1991

[51] Int. Cl.$^5$ .............................................. G01L 5/06
[52] U.S. Cl. .............................................. 73/862.472
[58] Field of Search .................... 73/862.472, 862.473, 73/862.474, 862.471; 242/148

[56] References Cited

U.S. PATENT DOCUMENTS

| | | | |
|---|---|---|---|
| 3,296,857 | 1/1967 | Kaczeus | 73/862.471 X |
| 3,520,492 | 7/1970 | Brown | 242/155 |
| 3,837,598 | 9/1974 | Brown | 242/155 R |
| 3,990,652 | 11/1976 | Brown | 242/129.8 |
| 5,040,741 | 8/1991 | Brown | 242/128 |

FOREIGN PATENT DOCUMENTS 2855592  6/1980  Fed. Rep. of Germany .................... 73/862.471

*Primary Examiner*—Jerry W. Myracle
*Attorney, Agent, or Firm*—Kinzer, Plyer, Dorn, McEachran & Jambor

[57] ABSTRACT

A tension measuring device for accurately measuring the tension applied to a fine, metallic wire, or the like, being uncoiled from a spool of wire, or the like. The tensioning device includes a pulley around which the wire is looped. The pulley is rotatably mounted at the end of an arm which itself is mounted on an axle for rotation under the influence of a first torsion spring which biases the arm against the tension forces exerted against the uncoiling wire and a second torsion spring which biases the arm against rotation caused by the weight of the arm and pulley. A knob is provided to twist the first torsion spring to increase the biasing force on the arm and pulley which counteracts the uncoiling tension on the wire. A pointer is associated with the knob and it moves across a scale indicating the amount of force applied to the first torsion spring. Another pointer is mounted on the arm and it moves across a second scale indicating movement of the arm above and below a zero point. A mechanism is provided for accurately zeroing the arm pointer by adjusting the tension force applied by the second torsion spring to overcome the weight of the arm and its pulley.

2 Claims, 2 Drawing Sheets

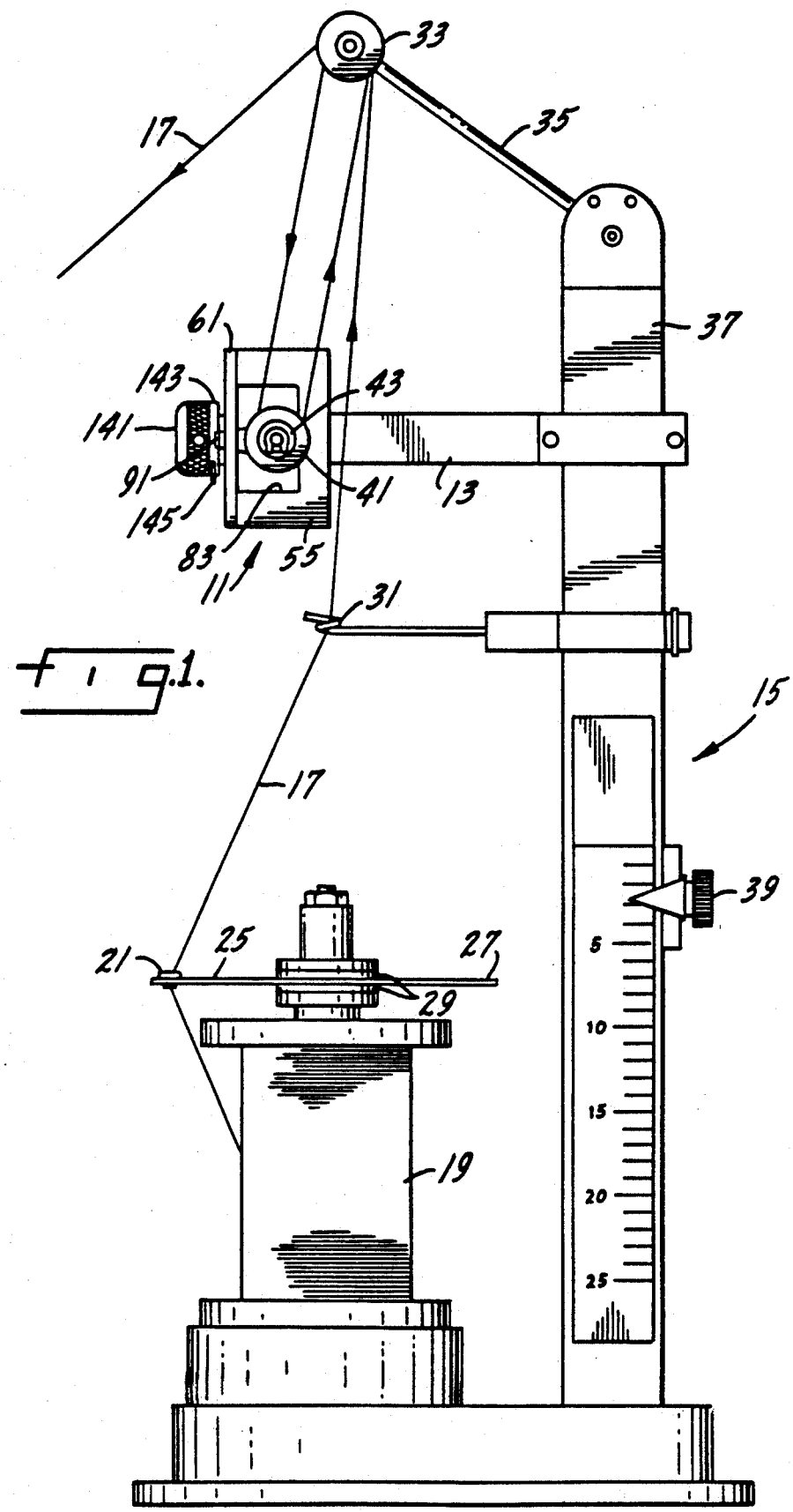

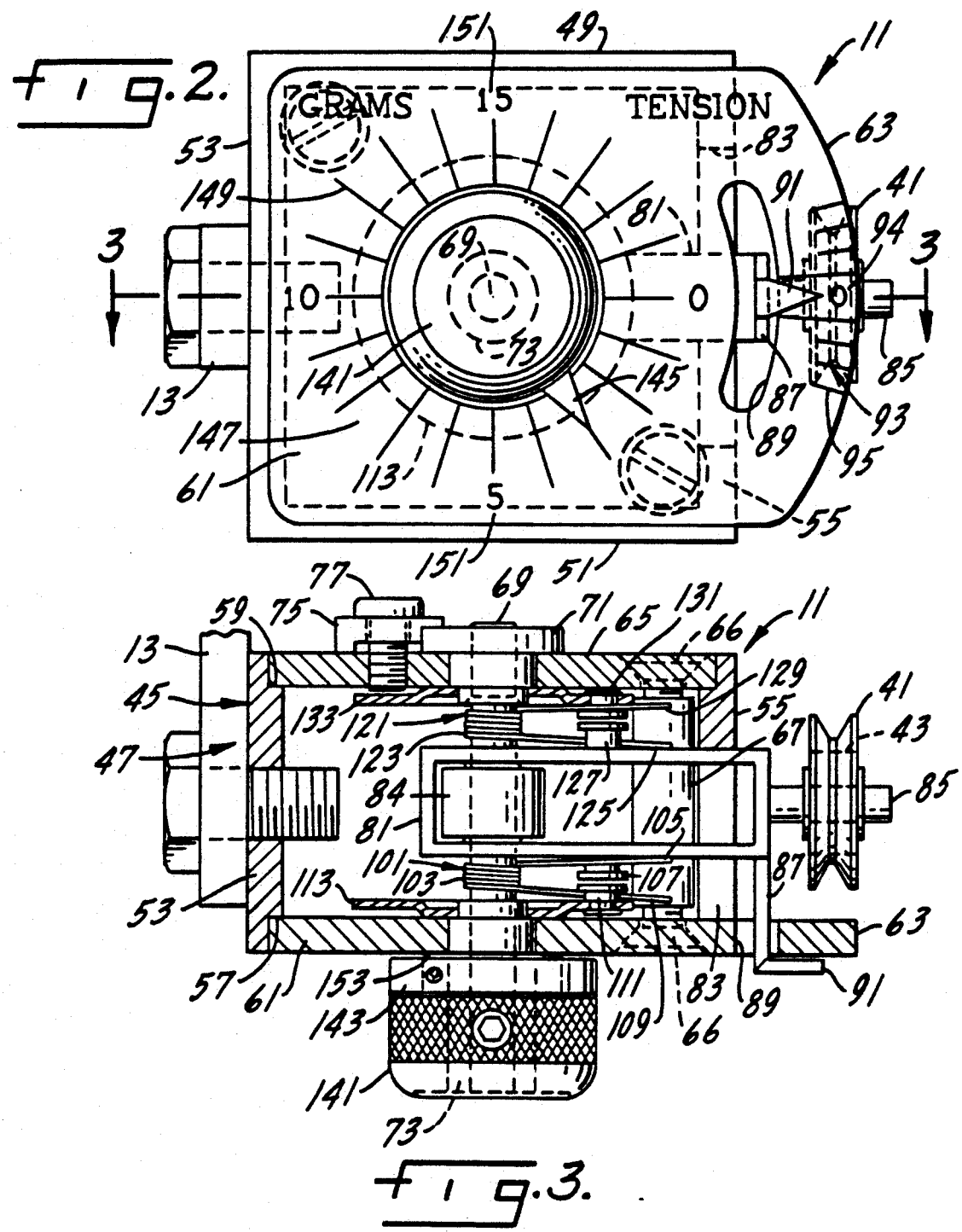

WIRE TENSION METER

SUMMARY OF THE INVENTION

This invention is concerned with a device for continuously measuring the tension being applied to a moving wire, especially a wire that is being uncoiled over the axial end of a fixed spool of wire and wound around a core or fixture. For simplicity of description, I have used the term wire in this specification and the attached claims. However, it should be understood and appreciated that the application of my invention is not limited to metallic wire but may also be used with thread or filament, whether of natural origin or synthetic composition, and whether stranded or monofilament. Thus, the term wire should be understood in this broader context hereinafter.

The device of this invention is specifically intended for measuring the tension on ultrafine wire which is being uncoiled and wound at the high winding speeds being presently utilized. By ultrafine wire, I mean wire having a diameter in the range of 44 to 56 AWG and stranded threads and monofilaments of similar diameters.

An object of this invention is a device for continuously measuring the tension being applied to a moving wire, which device can measure tension accurately over a wide range of relatively low forces, that is, forces which are measured in grams.

Another object of this invention is such a device which can be accurately calibrated.

Another object of this invention is a measuring device which applies low inertia forces to the ultrafine wire to prevent wire breakage due to high acceleration and deceleration of the wire during coiling and winding of the wire.

Other objects may be found in the following specification, claims and drawings.

BRIEF DESCRIPTION OF THE DRAWINGS

The invention is illustrated more or less diagrammatically in the following drawings wherein:

FIG. 1 is a side elevational view of the tension measuring device of this invention mounted on a tension applying apparatus;

FIG. 2 is an enlarged, front elevational view of the tension measuring device of FIG. 1; and FIG. 3 is a sectional view taken along line 3-3 of FIG. 2.

DESCRIPTION OF THE PREFERRED EMBODIMENT

FIG. 1 of the drawings shows a tension measuring device 11 of this invention mounted on an arm 13. The arm 13 is attached to an apparatus 15, which is used for establishing and maintaining tension on an uncoiling wire. An apparatus 15 may be of the type shown in my U.S. Pat. No. 5,040,741, issued Aug. 20, 1991. My tension measuring device 11 may also be used on other tension applying and maintaining devices.

The tension measuring device 11 of this invention is intended for use in measuring the tension applied to an ultrafine metallic wire 17 which is uncoiled over the axial end of a fixed spool of wire 19. As shown and described in my previously mentioned U.S. Pat. No. 5,040,741, the wire 17 passes through a ceramic eyelet 21 seated in a circular opening (not shown) of an arm 25 of a thin, flat plastic friction member 27 rotatably mounted above the spool 19. A braking mechanism 29 is provided to control the speed of rotation of the plastic friction member 27 and includes two felt washers mounted above and below the plate 27. These felt plates are engaged and disengaged from the plastic friction member 27 to control the speed of uncoiling of the wire 17. The wire 17 passes through a guide loop 31 which is supported by an arm attached to the tension maintaining apparatus 15. The wire 17 then extends around a pulley 33 located at the end of a pivoting arm 35 mounted at the top of column 37 of apparatus 15.

As explained in my U.S. Pat. No. 5,040,741, when the uncoiling tension applied to the wire 17 exceeds a predetermined tension, which is set and maintained by the sliding pointer 39 on the column 37 of the apparatus 15, which preset tension prevents the arm 35 from rotating, the arm 35 rotates downwardly and releases the braking mechanism 29 to allow the friction member 27 to rotate faster and reduce tension on the uncoiling wire 17. To accommodate and actuate the tension measuring device 11, the wire 17 is looped around the pulley 33 on the pivoting arm 35 and a pulley 41 which is a part of the tension measuring device 11. The pulley 41 is formed of nylon and has a ball bearing hub 43.

Referring now to FIG. 3 of the drawings, the tension measuring device 11 includes a hollow housing 45 formed of a lightweight metal such as aluminum. The hollow housing is built around a general rectangular frame 47 having top, bottom and end walls 49, 51, 53 and 55, respectively, with an open front 57 and an open rear 59. The open front is closed by a plate 61 which slides into notches formed in the top and bottom walls. The plate 61 also has an arcuate end 63 which extends beyond the end wall 55 of the frame. The open rear 59 is closed by a removable plate 65. Screws 66 extend through openings in the front plate 61 and the rear plate 65 and thread into posts 67 located between the plates to fasten these plates to the frame 47.

A rod 69 extends through the housing 45 from outwardly of the front plate 61 through the rear plate 65. The rod is journalled at one end in a bushing 71 which, in turn, is journalled in the rear plate 65. The opposite end of the rod 69 is affixed to a bushing 73 which is journalled in the front plate 61. The bushing 71 is secured against rotation relative to the rear plate 65 by a clamp plate 75 which is held in position by a screw 77. A hollow box-like arm 81 is pivotally mounted on the rod 69 inside the housing 45 and extends outwardly of the housing through an opening 83 in the end wall 55. A bushing 84 is affixed to the rod 69 inside the hollow box-like arm 81.

A stub shaft 85 is mounted on the outer end of the arm 81 with the ball bearing 43 and pulley 41 rotatably mounted on the stub shaft. A pointer arm 87 is attached to the end of the arm 81 and extends through an arcuate slot 89 formed in the front plate 61 of the housing. A pointer 91 is formed at the outer end of the pointer arm and the pointer 91 is movable across a scale 93 formed on the front face of the front plate 61, as shown in FIG. 2 of the drawings. The scale 93 has a zero center mark 94 and markings 95, each indicating a one gram deviation above or below the zero center marking 94.

A first torsion spring 101 is installed in the housing 45. The spring 101 has a coil portion 103 which telescopes over rod 69 between the arm 81 and the front plate 61. The spring 101 has a first arm 105 which engages the top of a spring retainer button 107 affixed to the arm 81. A second arm 109 of spring 101 engages the underside of a spring retainer button 111, which is affixed to spring adjustment disk 113. The spring adjustment disk 113 is affixed to and rotates with the bushing 73 which extends through the front plate 61 of the housing 45.

The spring arm 105 biases the arm 81 and its pulley 41 to rotate in a downwardly direction, as viewed in FIGS. 1 and 3 of the drawings, which is a clockwise direction as viewed in FIG. 2 of the drawings. The spring force biases the arm 81 and its pulley 41 against the tension forces exerted on the moving wire 17 which forces tend to pull the arm 81 and its pulley 41 in an upward direction, as viewed in FIGS. 1 and 3 of the drawings, and counterclockwise as viewed in FIG. 2.

A second torsion spring 121 is installed in the housing 45 between the arm 81 and the rear plate 65. This second torsion spring has a coil portion 123 which telescopes over the rod 69. A first arm 125 of the torsion spring 121 contacts the underside of a spring retaining button 127 affixed to the arm 81. A second arm 129 of the spring 121 engages the top of a spring retaining button 131 affixed to a spring adjustment disk 133 which is affixed to the bushing 71 extending through the back plate 65 of the housing. The second torsion spring 121 biases the arm 81 in an upwardly direction, as viewed in FIGS. 1 and 2 of the drawings, and a counterclockwise direction as viewed in FIG. 2 of the drawings. The function of the second torsion spring is to overcome the weight of the arm 81 and the pulley 41 to hold them at the zero position of adjustment of the pointer 91 relative to the scale 93.

A knob 141 slides over and is affixed to the bushing 73 outwardly of the front plate 61 of the housing. Positioned between the knob 141 and the front plate 61 is a pointer ring 143 which also slides over the bushing 73. The pointer ring has a second pointer 145 which moves in a circular path across the front face of the front plate 61. A second scale 147 is applied to the front face of the front plate 61 surrounding the knob 141. The second scale 147 has markings 149 calibrated in grams of force. Indicia 151 indicate numerical quantity of the force in grams. A wave spring 153 is positioned between the pointer ring 143 and the front plate 61 to maintain the pointer ring 143 against the knob 141 so both rotate together.

The use, operation and function of this invention are as follows:

The tension is set on the uncoiling wire 17 by the sliding pointer 39 of the tension applying and maintaining mechanism 15 shown in FIG. 1 of the drawings. For example, three grams of tension are set on the sliding pointer 39 of the mechanism 15, as seen in FIG. 1 of the drawings. Accordingly, the knob 141 would be rotated in a clockwise direction, as shown in FIG. 2 of the drawings, until the second pointer 45 is aligned with the marking 149 of the second scale 147 which indicates three grams of tension. The rotation of the knob 141 would also rotate the spring adjustment disk 113 and thereby rotate the arms 105 and 109 of the first torsion spring 101 in a clockwise direction, as viewed in FIG. 3 of the drawings. The arm 105 engages the spring retainer button 107 of the pulley arm 81 to also rotate its pulley 41 and its pointer 91 in a clockwise direction, as viewed in FIG. 2 of the drawings.

As the ultrafine wire 17 is uncoiled from the reel 19, the wire sliding around the pulleys 33 and 41 will exert three grams of tension on the wire, thus pulling the pulley 41 in an upward direction, as viewed in FIG. 2 of the drawings, until its pointer 91 aligns with the zero marking 95 on scale 93. When the pointer 91 is at the zero marking, the selected three grams of tension is being exerted against the wire 17. If the pointer 91 stops above or below the zero marking 95 on scale 93, the tension being exerted against the wire is not the amount selected by the pointer 145 of the knob 141. Therefore, the sliding pointer 39 of the tension applying mechanism 15 must be properly adjusted.

Another advantage of this invention is that the pointer 91 can be adjusted so that it zeros exactly on its zero marking 95. This is accomplished by releasing the clamp plate 75 on the bushing 71 to permit rotation of the bushing and its spring adjustment disk 133. Rotation of the spring adjustment disk 133 will rotate the second torsion spring 121 to rotate the arm 81 and its pointer 91 to the correct neutral position of the arm.

I claim:

1. A tension measuring device for accurately measuring the tension applied to a fine wire, being uncoiled from a spool of wire, said device including:
   a hollow housing having front and rear walls,
   a shaft journalled in said front and rear walls and extending outwardly of said housing beyond said front wall,
   an arm rotatable mounted on said shaft,
   said arm extending outwardly of said housing on one side thereof,
   a pulley rotatably on said arm,
   a first scale located on the front face of said front wall,
   a first pointer affixed to said arm and movable across said first scale as said arm rotates on said shaft,
   a first torsion spring biasing said arm to rotate against the tension force exerted against said uncoiling wire,
   a second torsion spring biasing said arm against rotation caused by the weight of said arm,
   a second scale on the front face of said front wall,
   a knob having a second pointer which pointer moves across said second scale upon rotation of said knob, and
   means connecting said knob and said first torsion spring to adjust the biasing force exerted by said first torsion spring against said arm.

2. The tension measuring device of claim 1 in which said first torsion spring has a first arm which engages said arm rotatable on said shaft and a second arm, and
   said means connecting said knob and said first torsion spring to adjust the biasing force exerted by said first torsion spring against said arm includes a disk connected to said knob and rotatable therewith and a spring retainer button affixed to said disk, said spring retainer button engaging said second arm of said first torsion spring.

* * * * *